United States Patent [19]
Wärn et al.

[11] 3,736,969
[45] June 5, 1973

[54] PIERCE NUT

[76] Inventors: Herman K. Wärn, Asvagen 16, Hallstahammar; Sixten H. Lejdegård, Lilla Annehill, Ramnas, both of Sweden

[22] Filed: July 20, 1971

[21] Appl. No.: 160,313

Related U.S. Application Data

[63] Continuation of Ser. No. 871,661, Nov. 3, 1969, abandoned.

[30] Foreign Application Priority Data

Sept. 22, 1966 Sweden ..............................12776/66
Dec. 6, 1966 Sweden ..............................16641/66

[52] U.S. Cl. .............................................151/41.73
[51] Int. Cl. ...........................................F16b 39/00
[58] Field of Search .................151/41.73; 29/432, 29/432.1, 432.2

[56] References Cited

UNITED STATES PATENTS

| | | | |
|---|---|---|---|
| 3,253,631 | 5/1966 | Reusser | 151/41.73 |
| 3,314,138 | 4/1967 | Double | 151/41.72 |
| 3,315,345 | 4/1967 | Double et al. | 151/41.73 |
| 3,337,946 | 8/1967 | Anderson et al. | 151/41.73 |
| 3,399,705 | 9/1968 | Breed et al. | 151/41.73 |

FOREIGN PATENTS OR APPLICATIONS

| 947,097 | 1/1964 | Great Britain | 151/41.73 |
|---|---|---|---|

*Primary Examiner*—Marion Parsons, Jr.
*Attorney*—David Toren

[57] ABSTRACT

A pierce nut having an attachment member extending axially from one end of a nut body. The attachment member is adopted to pierce a sheet member and then secure the nut to the sheet member. The attachment member is substantially square in transverse section and has a groove formed in its sides so that it can engage and grip the sheet member. The sides of the attachment member taper outwardly from its outer edge forming a cutting edge for piercing the sheet member.

5 Claims, 7 Drawing Figures

Patented June 5, 1973   3,736,969
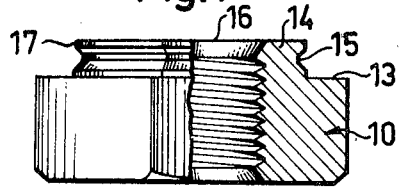
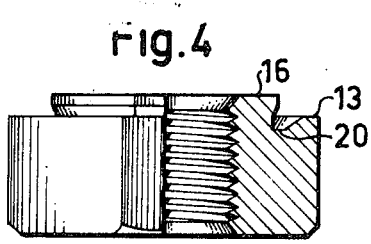
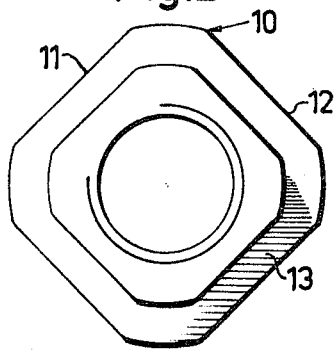
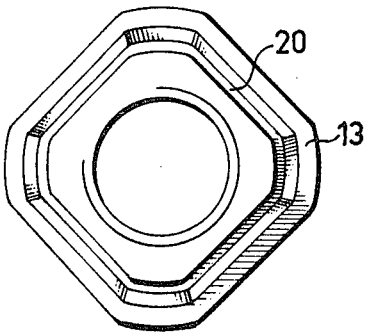
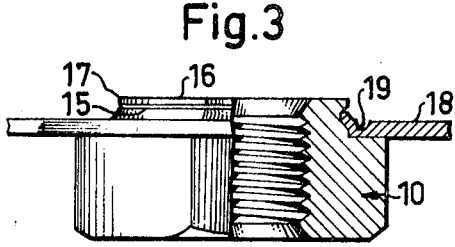
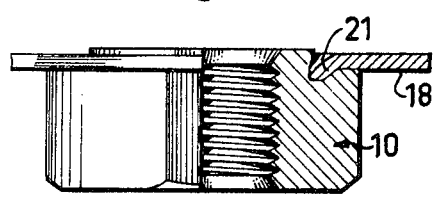
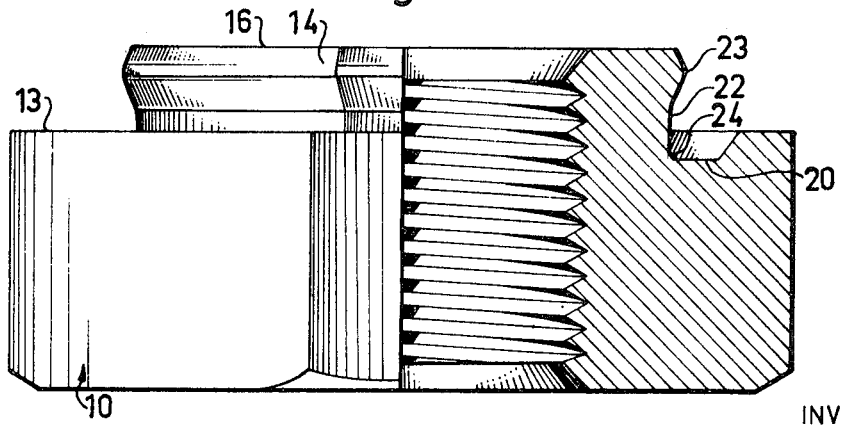
INVENTORS
HERMAN WÄRN
SIXTEN LEJDEGARD
BY *MacGlew and Toren*
ATTORNEYS

PIERCE NUT

This application is a continuation application of our copending application for U.S. Patent, Ser. No. 871,661, filed Nov. 3, 1969, now abandoned.

SUMMARY OF THE INVENTION

Among all the fastening members available commerically the so-called pierce nut has lately attracted an ever increasing attention, above all in the automobile industry and similar industries where the problem often arises that details have to be secured to rather thin sheet metal by means of screws. The pierce nut is designed such that when applied it pierces its own hole in the plate and remains therein to serve as a strong threaded fastening member.

One of the two types of pierce nut probably most common at present comprises a nut body that is quite similar to an ordinary hexagonal nut. One end surface of this pierce nut has a circular depression containing a plurality of radal ribs or the like intersecting the depression and intended to prevent turning of the nut after its application. The circular depression forms an annular collar around the thread of the nut and the end surface of this collar serves as a die for the piercing operation. The outer side of the collar forming the wall of the depression is somewhat undercut or recessed so that immediately following the piercing the plate is recessed into the recess in the exterior of the annular collar to create a permanent connection between the plate and the piercing nut. The pierce nut just described has many undeniable advantages, but is also has the shortcoming that at times the radial ribs are not sufficient to prevent a twisting of the nut.

The other one of the two most popular types of pierce nut consists of a nut body substantially T-shaped in axial section. In the manufacture, this body is cut from a steel strip approximately T-shaped in cross section. The sides of the T-converge slightly towards a base, the end surface of which serves as a die, said base offering the desired recess for keeping the nut in its hole on application. Also this kind of pierce nut has many undeniable advantages but also a few not inconsiderable drawbacks. Firstly, the production from a precision-rolled steel strip offers some problems, as will readily be appreciated by a person skilled in the art, and secondly, only two supporting contact surfaces are obtained, viz. on the underside of the cross bar of the T-profile, with which this type of pierce nut engages the plate. Thus, a fully satisfactory support against a rocking movement of the nut is obtained in one of the planes parallel to the nut axis only. As the nut has only two opposing contact surfaces and wholly lacks corresponding contact surfaces on its other two sides, there is of course the risk of an impermissibly great hole edge pressure in some applications. The same thing applies to the base portion forming the recess and serving to hold the nut and which is to be found on two sides of the nut only.

The object of the present invention is to provide a pierce nut which does not have the shortcomings mentioned above, and for this purpose the pierce nut according to the invention is characterized in that, seen from above, the attachment member has four to eight — preferably four — straight sides, all with an undercut recess and in that the attachment member is centrally disposed of the nut body which, in top view, is larger than the attachment member so that the end surface of the nut body forms an unbroken contct surface extending circumferentially around the attachment member.

The invention will be described in greater detail with reference to the accompanying drawings.

FIGS. 1 and 2 show a side elevation (partly in section) and a top view, respectively, of an embodiment of the pierce nut according to the invention;

FIG. 3 shows the nut in FIG. 1 in mounted position;

FIGS. 4, 5 and 6 are similar to FIGS. 1-3, respectively, but show a pierce nut of slightly modified design;

FIG. 7 shows partly in section and to an enlarged scale a third embodiment of the nut according to the invention.

The pierce nut shown in FIGS. 1-3 consists of a nut body 10 having four flat side surfaces 11,12 opposed in pairs for locating the nut on application and for engagement with a suitable tool, if required. It should be noted that the nut body 10 may also have more or fewer flat surfaces than four and that in some cases it may even be cylindrical. In this embodiment the pierce nut has a substantially flat surface 13 from which a central attachement member 14 approximately square in top view projects upwards. The attachment member 14 is dimensioned such that the surface 13 extends without interruption all round it. According to the invention, it is essential that in top view the attachment member 14 is substantially square. In the embodiment shown, the surface 13 has approximately the same width all around but it will be appreciated that its shape will be different if the nut body 10 has another polygonal shape than the one shown, or possibly round shape, while the requirement that the attachment member 14 should be square is maintained. In any case the surface 13 extends all around the attachment member 14.

In the exterior of the attachment member 14 slightly above the surface 13 there is provided a circumferential groove 15 produced by first making the member in question conical and then flattening it somewhat on the end surface 16 serving as a die so that a flage 17 has been provided by deformation.

With reference to FIG. 3, it will be appreciated that when being applied the pierce nut is pressed forcefully against the plate 18 so by means of the attachment member 14 it punches its own hole in the plate with countersupport from the opposite side, i.e. the top side in FIG. 3, from some suitable tool, not shown. In the embodiment shown in FIGS. 1-3, the tool is conveniently designed such that following the piercing of the plate 18 it stamps a groove 19, and thereby part of the plate material is deformed and pressed more forcefully against the exterior of the attachment member 14 and to some extent also into the groove 15 in the exterior of the attachment member 14.

It will be appreciated that the pierce nut is easily manufactured at low cost by cold heading, for instance, and that the square shape of the attachment member offers good security against turning at the same time as the circumferential surface 13 provides a low hole edge pressure as well as security against a rocking movement of the pierce nut on all sides.

The embodiment in FIGS. 4-6 is very similar to the one shown in FIGS. 1-3. However, in this embodiment the end surface 13 is not quite flat as far as the attachment member 14 but instead it has a depression 20 near that port, and on application of the nut the edge 21 of the plate is pressed into said depression. Also in this case the attachment member 14 has an external circumferential groove or recess, formed in that the attachment member 14 has first been made with a substantially axially directed exterior then slightly flattened from the end surface 16 serving as die. It should be obvious to a man skilled in the art that the embodiment of the pierce nut according to the invention shown in FIGS. 4–6 has all the advantages mentioned in connection with the embodiment shown in FIGS. 1–3.

The embodiment in FIG. 7 differs from the above disclosed embodiments essentially, in that the attachment member 14 has a conically tapering outer end portion the height of which is 10–60 percent and preferably about 25 percent of the total height of the attachment member. Half the angle of taper, i.e. the angle under which the outer surface of the conical portion is inclined with respect to the axis of the nut, is 1°–20° and preferably about 3°–5°.

The outwardly tapering portion merges with the undercut recess 22 of this nut with a smooth rounded off portion 23.

It has been found particularly advantageous to let the side surface of the attachment member 14 merge with the flat surface of the nut or with the bottom surface of the recess 20 round the attachment member, if any, in a smoothly rounded arching 24, the radius of which may be of the order of 0.2–1.0 mm, for instance, depending on the other dimensions of the nut.

It will be realized that the tapering end portion on application of the nut brings about a certain displacement of the plate material, at least partly within the limit of elasticity of the material, which displacement recovers at least partly as the nut has been fully introduced so as to contribute to an improved grip on the nut in mounted position.

It should be added that certain modifications and alterations of details may be made within the scope of the inventive idea.

What we claim is:

1. A pierce nut for installation without distortion in a non-apertured plate comprising a nut body and an integral polygonal pilot projection extending axially from one end face of said nut body, said pilot projection having a free end face extending transversely of the axis of said nut and peripheral side surface extending between said free end face and said one end face of said nut body, said pilot projection serving as a punch to form an opening in the plate to which said nut is to be secured when forcing the nut into said plate with said free end face in engagement with one side of said plate, said pilot projection peripheral side surfaces having an undercut formed in the side surface thereof and adapted to be engaged by an edge portion of the opening formed in the metal plate, the free end face of the pilot projection surrounded by a relatively massive piercing shoulder extending from said end face, toward said undercut, substantially parallel to said nut axis and overhanging said undercut, said pilot projection being centrally disposed on said nut body so that the nut body extends laterally outwardly on all sides from the side surfaces of said pilot projection and said one end face of said nut body forms a contact surface spaced from and extending circumferentially around said polot projection; said nut body having a substantially continuous groove formed in said one end face and said groove having a bottom wall merging into the pilot projection undercut and extending laterally outwardly beyond the projection of said pilot shoulder, so that the portion of the plate filling said groove is contiguous with the plate portion filling said undercut inwardly of the overhanging portions of said pilot projection.

2. A pierce nut as defined in claim 1, wherein the nut body groove is also polygonal and continuous about the circumference of the pilot projection to merge continuously into said undercut.

3. A pierce nut for installation without distortion in a non-apertured plate comprising a relatively massive nut body surmounted by a reduced polygonal pilot projection located centrally of said nut body, both said nut body and said reduced pilot projection being symmetrical about a vertical axis and both being traversed by a tapped hole concentric with said axis, said pilot projection having a planar end piercing face normal to said axis surrounded by a relatively massive piercing shoulder and said nut body having a planar stop shoulder also normal to said axis and located in axially spaced relation to said planar end face, said pilot projection having peripheral side surfaces joining said planar end face to said stop shoulder, said pilot projection serving as a punch to form an opening in said plate to which said nut is to be secured upon forcing the nut into said plate with the planar end face in engagement with one side of said plate, said stop shoulder then abutting the one side of said plate with the pilot projection peripheral side surfaces adapted to be engaged by an edge portion of the opening formed in the metal plate, said piercing shoulder extending from said end face substantially parallel to said nut axis and terminating in an undercut formed around the pilot projection and the planar stop shoulder of said nut body having a substantially continuous groove formed in the surface thereof engaging the plate and surrounding said pilot projection, said groove having a bottom wall extending beneath said piercing shoulder and laterally beyond the projection of said piercing shoulder, and said undercut and said groov merging into one another at a location radially intermediate the peripheral edge of said end piercing face and axially within the confines of said nut body.

4. Pierce nut comprising a tapped nut body and an integral tapped attachment member projecting axially from one end face of said nut body and having a free end face extending transversely of the axis of said nut and lateral surfaces extending between said free end face and said one end face of saie nut body, said attachment member serving as a punch to form an opening in a metal plate to which said nut is to be secured when forcing the nut into said plate with said free end face in engagement with one side of said plate, said attachment member having in at least some of said lateral surfaces an undercut recess adapted to be engaged by an edge portion of the opening formed in the metal plate, wherein the improvement comprises the combination of the following features:

a. said attachment member in all phases normal to the axis of said nut being substantially square with straight sides;

b. the corners of said attachment member joining adjacent straight sides being rounded off in the plane normal to the axis of said nut;

c. all of said lateral surfaces sides of said attachment member having the undercut recess therein forming a continuous recess about said attachment member;

d. said attachment member being centrally disposed on said nut body which in a plane normal to the axis of saie nut extends laterally outwardly on all sides from the lateral surfaces of said attachment member so that said one end face of said nut body forms an unbroken contact surface spaced from and extending circumferentially around said attachment member;
e. said nut body has a depression running circumferentially around said one end face and said depression adjoins said attachment member and said undercut recess and has a configuration in a plane normal to the axis of said nut closely similar to the outer contour of the attachment member in a plane parallel thereto having four substantially straight sides and with rounded corners between adjacent sides;
f. the radially outer surface of said depression sloping inwardly relative to the axis of the nut body from said one end face thereof to a transverse bottom surface which joins the side surface of said undercut recess;
g. said lateral surfaces of said attachment member tapering outwardly from said free end surface toward said nut body to a smooth rounded portion and then tapering inwardly to define in part said undercut recess and said outwardly tapering surfaces amounting to about 10–60 percent of the total axial dimension of said attachment member; and
h. said tapering surfaces merging smoothly with the undercut recess in said side surface.

5. Pierce nut, as set forth in claim 4, characterized therein that the angle of the tapering portions of said lateral surfaces being between 1° and 20° relative to the axis of said nut.

* * * * *